April 28, 1959 P. DE ROSE 2,883,904
COMBINED MOVIE CAMERA, VIEWER AND PROJECTOR
Filed April 10, 1957 2 Sheets-Sheet 1

INVENTOR.
PARADISE DE ROSE
BY
ATTORNEY

April 28, 1959 P. DE ROSE 2,883,904
COMBINED MOVIE CAMERA, VIEWER AND PROJECTOR
Filed April 10, 1957 2 Sheets-Sheet 2

INVENTOR.
PARADISE DE ROSE
BY
*ATTORNEY*

2,883,904
COMBINED MOVIE CAMERA, VIEWER AND PROJECTOR

Paradise De Rose, New York, N.Y.

Application April 10, 1957, Serial No. 652,028

1 Claim. (Cl. 88—17)

This invention relates to a motion picture camera that can also be used as a projector, or as a device for viewing or inspecting strips of motion picture film.

Ordinarily, it is necessary for one to purchase a camera, projector, and viewer as completely separate items, at a rather substantial expense. It is to be noted in this regard, that this is, of course, to be avoided as far as possible, particularly in view of the fact that items of this type are, individually definitely not in the category of low cost articles.

In view of the above, it is proposed in carrying out the invention to provide a combination device of the character described, the cost of which will be little greater than that which would be involved if any of the mentioned items were purchased separately.

Another object is to provide a device of the character stated which would be capable of swift and easy conversion to any of its intended uses.

Still another object is to provide a combination device of the character stated which will be so designed as to insure that there will be no interference between the components incorporated in the device for the various purposes stated above, that is, when the device is in use as a camera there will be no interference from the means that adapts the same for use as a projector, etc.

Still another object is to provide a combination camera, projector, and viewer which will be no greater in size than a conventional motion picture camera not having the desirable characteristics of the invention.

A further object of importance is to include, in a device of the character described, a novel arrangement for normally disposing the light beams of the projector in an out-of-the-way position when the device is in use as a camera or viewer.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
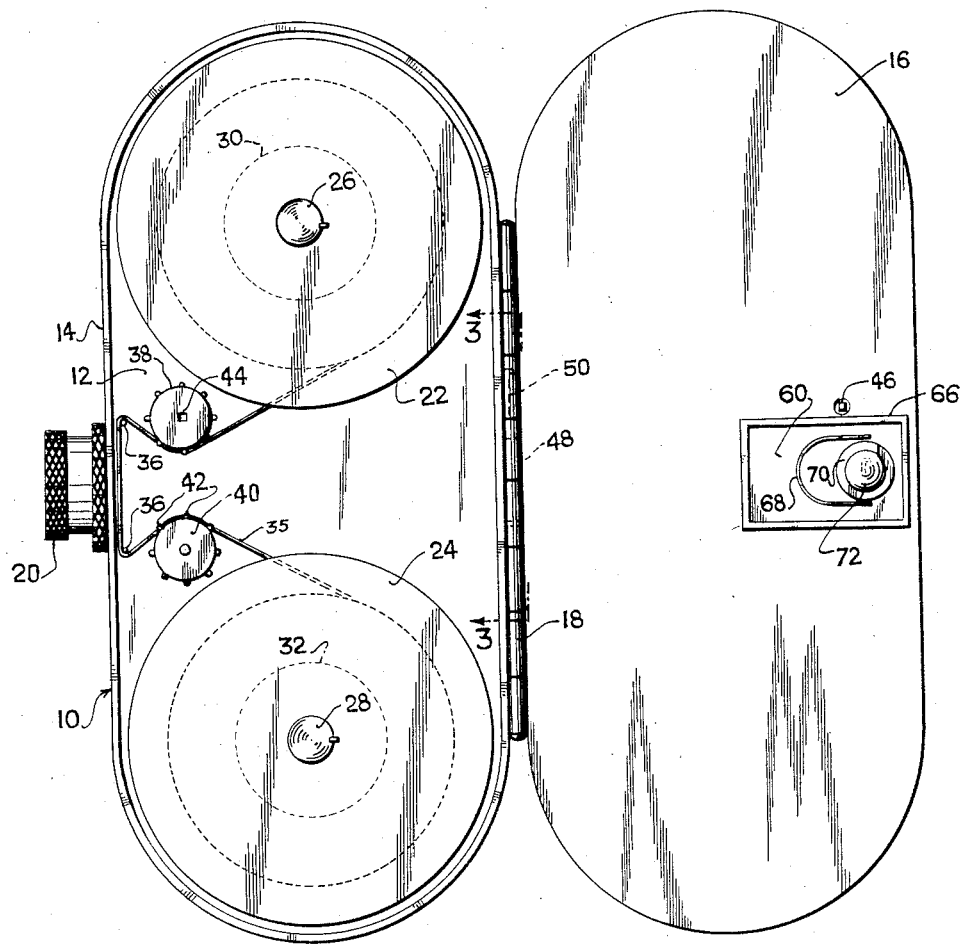
Fig. 1 is an elevational view of a combination camera, projector, and viewer according to the present invention, with the cover open, the cover being partially broken away.

Referring to the drawings in detail, designated generally at 10 is a generally oblong case having rounded ends, said case having a back wall 12 and a side wall 14. A cover 16 is of an outer configuration substantially duplicating that of the case, and is connected to the case by a hinge 18, for swinging movement of the cover between the open Fig. 1 position thereof and the closed position shown in Fig. 2. It will be understood that the cover would be provided with a suitable latch means, designed to releasably engage the cover in its closed position.

The device has the usual lens 20, and through the lens opening not only would light be admitted during the use of the device as a motion picture camera, but also, the picture would be projected through this opening when the device is in use as a projector. Still further, when the device is in use as a viewer the lens opening will provide a background of light for the film strip being projected. It is believed within the spirit of the invention to permit the ready removal of the lens, so that lenses of different types can be applied, according to the particular use to which the device is to be put.

Figures 5, 6:
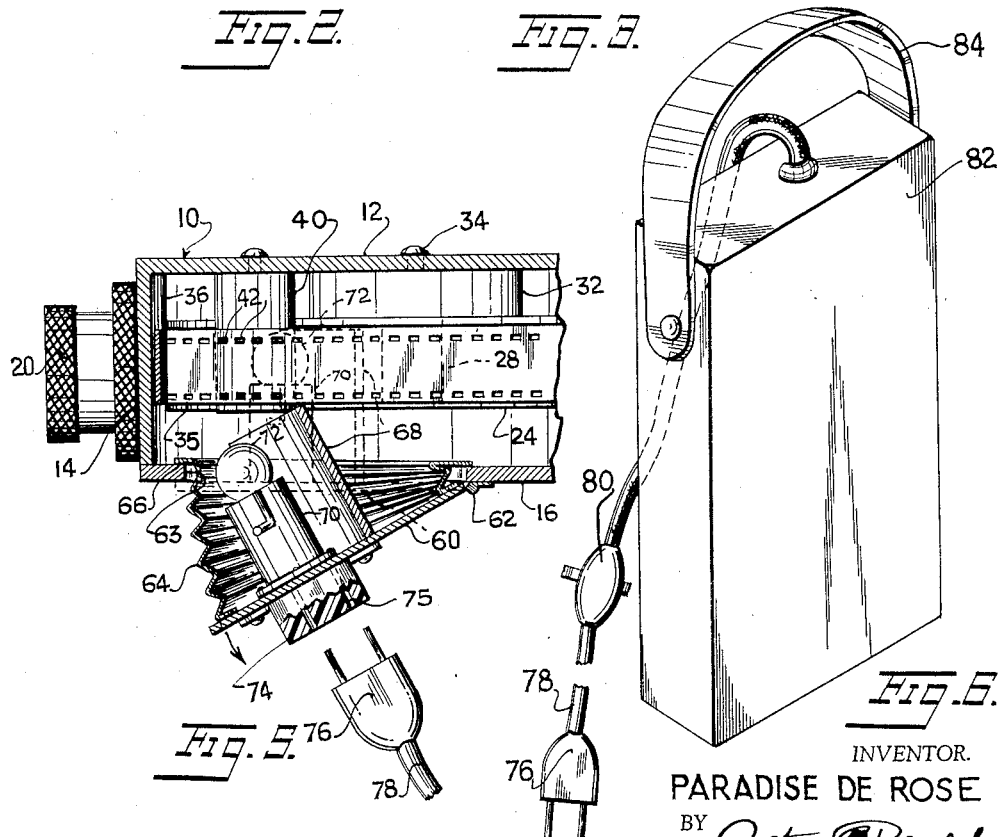
Fig. 5 is an enlarged transverse sectional view on line 5—5 of Fig. 2, the light means being shown in operative and inoperative positions in dotted and full lines respectively.
Fig. 6 is a perspective view, portions being broken away, of a portable battery unit used for supplying power to the light beams.

In any event, within the rounded ends of the case there are rotatably mounted reels or drums 22, 24, releasably engaged with reduced spindles 26, 28 for rotation with the spindles, said spindles being mounted upon hubs 30, 32 that are rotatably supported against the back wall 12 by pins or axles 34 (Fig. 5).

Against the front wall of the motion picture camera, that is, the wall shown at the left in Fig. 1 and carrying the lens, there are mounted, in position extending transversely of the casing guide pins 36 one above and one below the lens. A film strip 35 is trained about the pins, so as to extend between the pins directly across the lens opening as shown in Fig. 1. The film strip is trained, adjacent the respective pins, about sprockets 38, 40, having sprocket teeth 42 engaging in the usual rows of openings provided in the film strip adjacent the opposite edges thereof.

Figure 2:
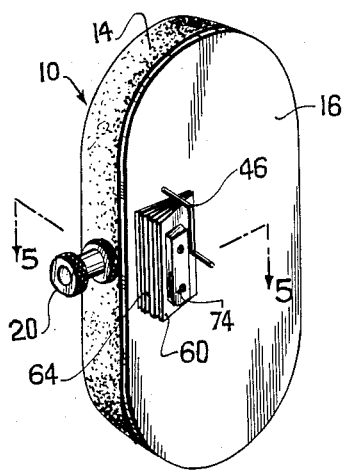
Fig. 2 is a perspective view of the device on a reduced scale.

One of the sprockets constitutes a drive sprocket, this being the sprocket 38. As shown in Fig. 1, the drive sprocket has a noncircular opening 44, adapted to receive a complementarily shaped inner end portion of a hand crank 46 journalled in cover 16 (Figs. 1 and 2).

From the description so far provided, it will be seen that when the device is to be used as a motion picture camera, the film is threaded about the sprockets and guide pins in the manner shown in Fig. 1, after which the cover is closed and the hand crank is rotated.

The showing of the device, in this connection, is somewhat diagrammatic, in the sense that only the most rudimentary and essential portions of a motion picture camera are shown. No attempt has been made to show other details well known in motion picture cameras, and with which the device would, of course, be provided. The showing of such details would only unnecessarily complicate the disclosure of the invention, and it is therefore deemed unnecessary to illustrate various camera mechanisms that would be employed. The device, for example, could be power driven rather than operated by a hand crank. Further, means may be employed for accelerating or slowing down the speed of rotation of the sprockets and drums, and other means may be employed for maintaining tension in the film strip, and for insuring to the maximum extent a smooth, uniform movement thereof.

Figure 3:
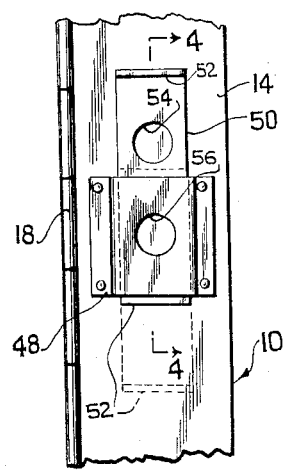
Fig. 3 is an enlarged, fragmentary rear elevational view of the device as seen from the line 3—3 of Fig. 1 with the cover closed.
Figure 4:
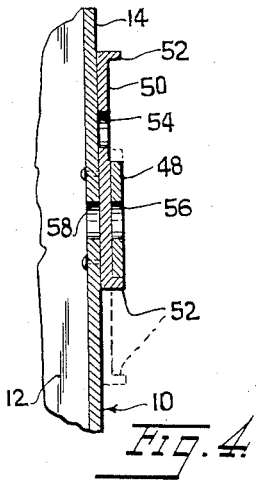
Fig. 4 is a sectional view, on the same scale as Fig. 3, taken on line 4—4 of Fig. 3, the dotted lines showing the viewing slide in its operative position.

Referring now to Figs. 3 and 4, there is here shown the means adapting the device for use as a viewer. In the wall diametrically opposite the lens 20, there is formed a viewing opening aligned with the lens opening and designated at 58 in Fig. 4. This opening is normally closed as shown in full lines in Fig. 4. To this end, there is provided a guide 48, having an outwardly offset midwidth portion and having side portions secured to the wall 14. A slide plate 50 is slidable between the full and dotted line positions of Figs. 3 and 4, and has outwardly directed lips 52 at its opposite ends. Adjacent one of the lips there is an opening 54, and in the guide plate 48 there is an opening 56 registered with the opening 58 (Fig. 4).

When the slide plate is in its normal, inoperative position of Fig. 3, opening 54 is out of register with openings 56, 58. Light thus cannot enter through the opening 58 and the device can be used either as a camera or projector.

If, however, it is desired to use the device as a viewer, the film strip would be threaded in the same manner as shown in Fig. 1. Then, the slide plate would be shifted to its dotted line position of Fig. 3, so that one can place his eye to the opening 56, and look across the space between the reels 22, 24 against the portion of the film strip tensioned between the pins 36. Light entering in back of the film through the lens opening, which would be kept open in these circumstances, will provide a background against which the frames of the motion picture strip can be separately inspected.

Referring now to the means adapting the device for use as a projector of motion picture films, a lamp assembly shown to particular advantage in Fig. 5 is movably mounted upon the cover, for adjustment inwardly and outwardly of the case, between operative and inoperative positions respectively. The lamp assembly moves into and out of the space between the sprockets, as readily seen from Fig. 5.

The lamp assembly includes a support plate 60 of rectangular configuration, hingedly connected at 62 to the cover 16 in position to overlie an opening 63 formed in the cover. The plate 60 is normally swung outwardly from the plane of the cover as shown in Fig. 5, and connected to the inner surface of the plate 60, and extending peripherally of the plate, is a collapsible, bellows-like marginal sealing member 64, one end of which is extended outwardly and adhesively, sealably secured to the edge portion of opening 63, the upper end being similarly connected to the edge portion of the plate.

Projecting inwardly from and fixedly secured to the plate 60 is a reflector 68. This is approximately U-shaped as shown in Fig. 1, and has a highly polished inside surface. The reflector extends partially about a lamp socket 70 fixedly mounted upon and extending inwardly from plate 60, with a conventional bulb 72 being detachably connected to the lamp socket in circuit with the socket.

Secured to the outer surface of the plate 60 is a female plug or receptacle 74, having prong-receiving slots 75 which would be provided, interiorly of the receptacle, with contacts respectively electrically connected to the opposite terminals of the socket 70. A male plug 76 is engageable in the receptacle 74, and is carried by a cord 78, provided intermediate its ends with a switch 80. The leads of the cord extend into a battery unit 82, being connected to opposite terminals of the battery housed in said unit, the unit being portable and being easily carried by means of a carrying handle 84.

Ordinarily, the plate 60 is in its outwardly swung position of Fig. 5. In this connection, the plate 60 can swing even further outwardly than its full line position of Fig. 5, so that the reflector 68 will be disposed wholly out of the space between the sprockets. An unobstructed line of vision between the viewing opening 58 and the lens is thus provided if the device is in use as a viewer. Further, there is no interference with the components of the device when it is in use as a camera.

If it is desired to use the device as a projector, plate 60 is swung inwardly to its dotted line position of Fig. 5, locating bulb 72 directly in back of the lens, with the reflector being at the same time arranged to cause all beams emanating from the bulb to be concentrated and directed through the lens opening, thereby projecting the film onto any suitable surface, not shown. The plate 60 can be manually held in its inwardly swung position, or if desired could be equipped with a latch, not shown, this being considered sufficiently obvious as not to require special illustration herein.

In this regard, the device can of course be equipped with a cooling means when the lamp bulb is illuminated, that is, a small fan or equivalent device could be mounted within the casing, at any suitable location, and normally closed ventilating openings could also be provided. Again, these are thought to be details that are well within the skill of those working in the art, and that do not require complete and detailed showing herein.

It will be seen from the description that has been provided herein that a single, compact device, the characteristics of a motion picture camera, motion picture projector, and film viewer are incorporated, with the user being permitted the swift conversion of the device to any of these three uses. This is achieved while providing a device, the overall cost of which will be little or no greater than that involved in the purchase of any one of the three types of devices described, thereby providing a highly desirable multi-purpose item of camera equipment.

Although not specifically illustrated herein, it is thought that the invention can be applied with equal facility to a still camera instead of a motion picture camera. In this instance the projector may be a slide projector, and the viewer would be adapted for the viewing of individual slides.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A device combining the functions of a camera, projector, and viewer, comprising a flat case having a rectangular cross section; a cover mounted on one side of the case, therefor, a lens opening on one end wall of the case, an opposite end wall having a viewing opening aligned with the lens opening, a manually operable slide having a single opening and mounted on said opposite end wall, said slide being movable to open and close said viewing opening, means for supporting a film in position across and adjacent the lens opening and lamp means adapted for disposition in back of the film adjacent the lens opening, said lamp means being swingably mounted upon the cover for movement into and out of position in back of the film, the lamp means including a plate pivotally connected to the cover and swingable outwardly therefrom when the lamp means is to be disposed out of its position in back of the film, said plate being swingable inwardly into face-to-face contact with the plate when the lamp means is to be disposed in back of the film, the lamp means further including a peripheral seal connected between said plate and the cover to prevent the admission of light about the plate when the lamp is out of said position back of the film, said seal being formed as a bellows-like, collapsible member, the lamp means further including a reflector arranged to direct beams emanating from the lamp means through the lens opening for projecting the film through said lens opening, a socket projecting inwardly from the plate and a lamp bulb carried by the socket, said reflector extending partially about the lamp bulb in back of the same, said lamp means further including means separably connectable electrically to the socket for connecting the socket with a source of electric power.

References Cited in the file of this patent

UNITED STATES PATENTS

| | | |
|---|---|---|
| 1,548,573 | Ackley | Aug. 4, 1925 |
| 1,774,097 | Hauser et al. | Aug. 26, 1930 |
| 2,015,261 | Eckler | Sept. 24, 1935 |

FOREIGN PATENTS

| | | |
|---|---|---|
| 288,547 | Germany | Nov. 16, 1916 |
| 152,708 | Australia | Aug. 5, 1953 |
| 491,016 | Italy | Feb. 23, 1954 |
| 315,158 | Switzerland | Sept. 15, 1956 |